United States Patent [19]

Elston

[11] Patent Number: 5,256,378
[45] Date of Patent: Oct. 26, 1993

[54] APPARATUS FOR COMPOSTING ORGANIC WASTE MATERIALS AND METHOD

[76] Inventor: Clinton R. Elston, Block 3, Lot 21, Tri-Valley Subdivision, Healy, Ak. 99743

[21] Appl. No.: 867,274

[22] Filed: Apr. 9, 1992

Related U.S. Application Data

[63] Continuation of Ser. No. 517,398, Apr. 27, 1990, abandoned, which is a continuation of Ser. No. 193,878, May 13, 1988, abandoned, which is a continuation-in-part of Ser. No. 931,657, Nov. 17, 1986, abandoned.

[51] Int. Cl.$^5$ ............................................... B09B 3/00
[52] U.S. Cl. ..................... 422/184; 422/224; 422/225; 422/230; 210/603; 210/617; 71/9; 71/14
[58] Field of Search ............... 422/184, 224, 225, 230; 71/8, 9, 12, 13, 21, 14; 210/151, 605, 606, 603, 621, 617, 622, 624, 629, 631; 435/313, 315, 316

[56] References Cited

U.S. PATENT DOCUMENTS

| | | | |
|---|---|---|---|
| 3,236,743 | 2/1966 | Pierson | 435/287 |
| 3,314,765 | 4/1967 | Abson et al. | 422/109 |
| 3,316,608 | 6/1964 | Lindstrom | 422/193 |
| 3,824,632 | 7/1974 | Bach et al. | 4/318 |
| 3,879,285 | 4/1975 | Yost | 210/629 |
| 4,142,975 | 3/1979 | Kinzer | 210/195.1 |
| 4,148,691 | 4/1979 | Malick | 435/315 |
| 4,196,082 | 4/1980 | Salokangas et al. | 210/532.2 |
| 4,198,211 | 4/1980 | Shattock | 71/8 |
| 4,213,864 | 7/1980 | Asikainen | 210/167 |
| 4,233,266 | 11/1980 | Kummer | 422/184 |
| 4,249,929 | 2/1981 | Kneer | 71/9 |
| 4,313,234 | 2/1982 | Stewart | 71/8 |
| 4,358,540 | 11/1982 | Itoh et al. | 71/9 |
| 4,384,877 | 5/1983 | Nemetz | 71/9 |
| 4,758,344 | 7/1988 | Wildenhauer | 71/9 |

OTHER PUBLICATIONS

"Comparison of Compost Toilets," Clivus Multrum USA, Inc. (Cambridge, Mass.).
"Clivus Multrum Waterless Composting Waterless Composting Toilet System," Clivus Multrum USA, Inc. (Cambridge, Mass.).
"The Ecological Toilet," Envirolet.
"Odorless, Water-Saving Chemical Foam Flush Toilet," Nepon Toilet (Tokyo, Japan).
"This is Soltran," Ecos, Inc. (Concord, Mass.).
Ecos Inc., Letter dated Dec. 27, 1982.
"The Original Humus 80," Humus Makes Sense (Markham, Ontario, 1980).
"The Soltran Concept."
"This Modern Bathroom is Just Part of the World's Best Waste Treatment System," Clivus Multrum USA (Cambridge, Mass.).
"Microphor Marine Sanitation Devices; The Simplest, Most Economical Way to Meet USCG Requirements for Discharge MSDS," Microphor Willits, CA).

(List continued on next page.)

Primary Examiner—Robert J. Warden
Assistant Examiner—Hien Tran
Attorney, Agent, or Firm—Merchant, Gould, Smith, Edell, Welter & Schmidt

[57] ABSTRACT

An arrangement is provided for facilitating aerobic composting of organic material. The arrangement comprises a compost tank having an upper receiving volume, a central aeration and mixing volume, and a lower compost collection receiving volume. Preferably the central volume includes an air circulation arrangement directing air therethrough, and a mixing arrangement to facilitate mixing of organic material received therein. In the preferred embodiment, the lower compost receiving volume includes a substantially horizontal floor and a conveying mechanism, to convey fully or substantially fully composting material across the horizontal floor, toward a section of the tank from which it can be readily removed. A fluid circulation arrangement is provided, to facilitate liquid dispersion and moistening of organic material throughout the compost tank. In a preferred embodiment, an inlet and sludge transport arrangement for an associated greywater treatment tank are provided, to facilitate overall waste management for a dwelling house or the like.

6 Claims, 2 Drawing Sheets

OTHER PUBLICATIONS

"The Miracle System From Santec; Standing alone in the Industry."

"From the Pioneers of Biological Toilets; For the Luxurious Bathroom" The Tropic, Sun-Mar. Corporation (Dumas, Ontario).

"Enviroscope; Commodes, Black & Grey Water Systems," Enviroscope Corporation (Costa Mesa, Calif.).

"Chop Sticky Filter Cakes Down to Size," J. C. Steele & Sons, Inc. (Statesville, N.C.).

"Composting Toilet and Greywater Treatment Systems Water-Saving, Non-Polluting Energy-Efficiency, Odorless," Alascan (Healy, Ak.).

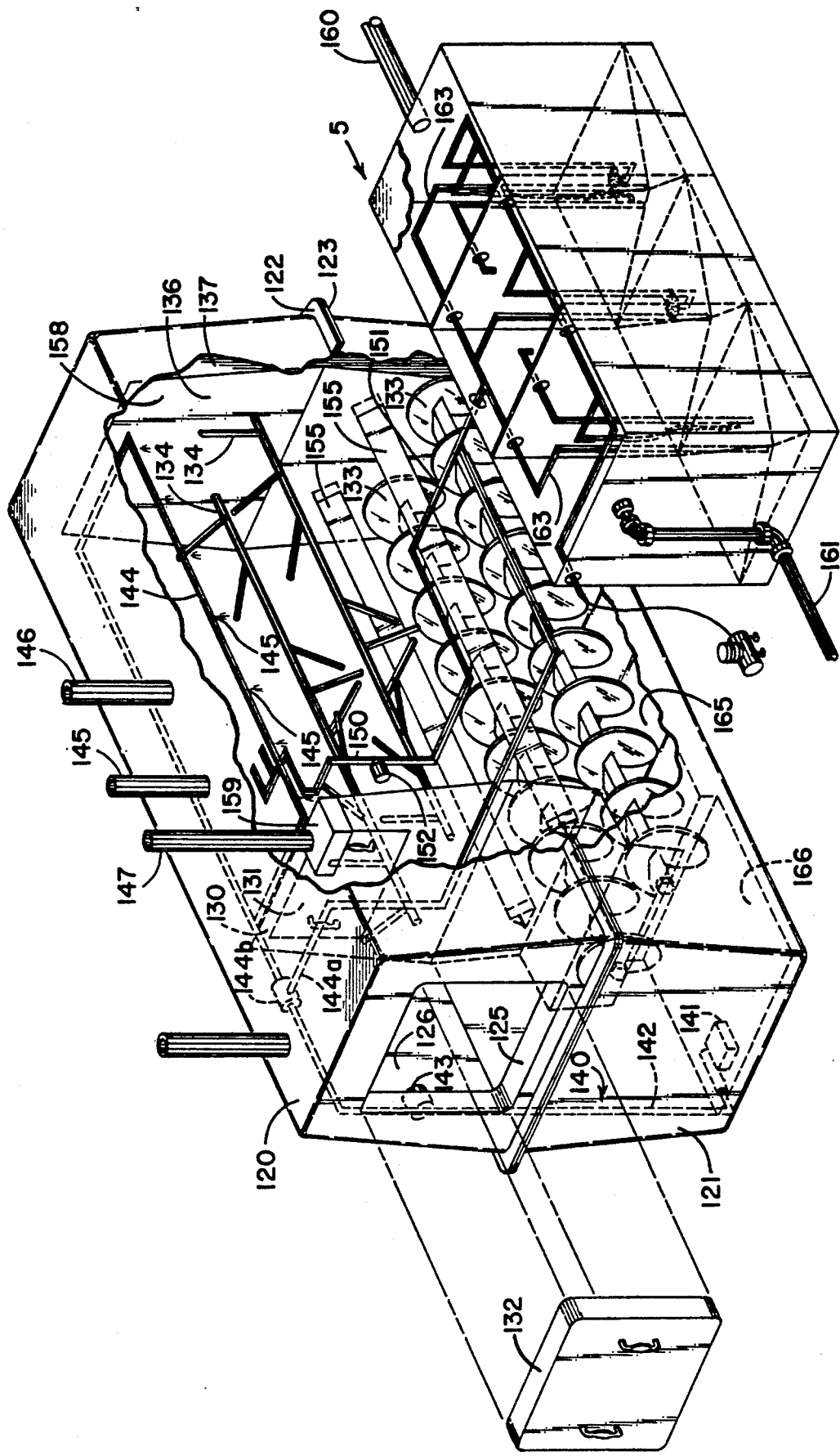

APPARATUS FOR COMPOSTING ORGANIC WASTE MATERIALS AND METHOD

This is a continuation of application Ser. No. 07/517,398, filed Apr. 27, 1990 (now abandoned), which is a continuation of application Ser. No. 07/193,878, filed May 13, 1988 (now abandoned), which is a continuation-in-part of application Ser. No. 06/931,657, filed Nov. 17, 1986 (now abandoned).

FIELD OF THE INVENTION

The present invention concerns the composting of organic waste materials such as human biologic wastes and kitchen wastes. The invention further concerns the composting of waste sludge material derived from greywater or the like.

BACKGROUND OF THE INVENTION

Human toilet wastes and kitchen wastes are often handled through hook-ups to sewer systems, or by distribution to septic tanks and leach fields. In many situations, however, sewage systems are not available. Further, especially under conditions of poor soils, high ground water or nearby surface water, septic tanks and leach fields may not be practicable.

In order to handle organic toilet wastes and kitchens wastes or the like under such situations, generally composting techniques are applied. Typically, the waste materials are subject to aerobic decomposition; that is, decomposition in the presence of air and oxygen. Using conventional techniques, up to about 90% of the waste volume can be readily eliminated, primarily as water vapor and carbon dioxide. The remaining waste material, being of a relatively small volume, can be fairly readily handled as, for example, a garden fertilizer or the like.

Such composting systems have been useful, since they generally require relatively little external energy, and often operate on application of indigenous microorganisms. A variety of arrangements have been developed for use as such composting arrangements, including a well-known construction developed by Clivus Multrum. Such conventional systems have been somewhat effective in providing for decomposition of waste organic materials. However, there has been some need for improved efficiency with respect to operation to achieve effective aerobic decomposition and/or final compost handling.

Another problem in the waste management area concerns the handling of "greywater". Greywater is the waste water from sinks, showers, etc., which includes some waste organics therein, but comprises primarily water. Greywater is generally purified prior to discharge, through various clarifying (settling) systems and/or floc skimming arrangements. Disposal of sludge resulting from floc removal or settling, has generally been a problem.

What has been needed has been a composting system particularly well adapted for efficient composting of organic materials, including human toilet wastes, kitchen wastes, and other materials rich in cellulose such as leaves, saw dust and paper. What has particularly been needed has been an arrangement whereby organic sludge from greywater can also be efficiently handled.

SUMMARY OF THE INVENTION

According to the present invention an arrangement is provided for facilitating aerobic composting of organic materials. In general, preferred arrangements according to the invention include a compost tank having a lower compost collection volume, a central mixing and aeration volume, and an upper receiving volume. These three volumes are generally in flow communication with one another, and organic material directed into the upper receiving volume will typically pass therethrough, and through the central mixing and aeration volume, and eventually fall into the lower compost collection volume, as the tank fills up.

The preferred arrangement includes agitation means in the central mixing and aeration volume, for selected mixing of organic material received and retained therein. Such mixing facilitates aerobic decomposition. For the preferred embodiment, the agitation means comprises a physical mixing apparatus such as elongate rod having tines, vanes or fingers thereon to generate mixing, upon rotation of the rod. The rotatable rod may be actuated and driven by a variety of means, including hand cranks and mechanized arrangements.

Arrangements according to preferred embodiments of the present invention also include a feed system for delivery of organic material into the receiving volume. A variety of arrangements and components may form part of the feed system, including inlets from toilets and/or garbage disposals. Further, means may be provided for facilitating loading of organic materials such as leaves, paper, garbage, and/or wood chips or the like. In preferred embodiments, the feed system includes a delivery means associated with a greywater treatment tank, to transport sludge from the greywater treatment tank into the upper receiving volume of the compost tank, for eventual settling through the compost tank to the lower compost removal volume.

Arrangements according to preferred embodiments of the present invention also include an air circulation arrangement, constructed and arranged for circulation of air through the central mixing and aeration volume. In the preferred embodiment, the air circulation arrangement or means includes a fan, baffle and air conduit arrangement. The air conduit arrangement provides for airflow communication from an air inlet arrangement through the central mixing and aeration volume, to the upper receiving volume, and outwardly through an air vent means in the tank. Preferably, airflow communication across the central mixing and aeration volume is facilitated by means of an air conduit or plurality of air conduits extending between baffle members. The air circulation means also preferably includes a fan arrangement mounted in the upper receiving volume and oriented to draw air through the mixing and aeration volume, from the air inlet, and to force the air outwardly through the vent. In a typical use, water and carbon dioxide products from decomposition are readily forced outwardly through the vent by means of the air circulation system.

To advantage, preferred arrangements according to the present invention include a liquid circulation means constructed for collection of liquid from the lower compost removal volume and circulation of same to upper portions of the compost tank, in particular into the central mixing and aeration volume. Preferably, the liquid circulation means or arrangement includes a fluid conduit in communication with a lower fluid collection area, a pump arrangement for forcing fluid therethrough, and a dispersion system in communication with the conduit, for spraying collected liquid into the central mixing and aeration volume. The liquid circulation arrangement may include means for collecting and directing any excess water in the compost tank outwardly therefrom, for example to a greywater treatment tank.

In preferred embodiments, the compost tank includes a substantially horizontal lower floor, positioned underneath the lower compost collection volume. Lower portions of the compost tank include a removal area for fully decomposed material. Preferably the arrangement includes a conveying means for transporting fully decomposed material across the horizontal floor, and into the removal area or volume. Access means are provided to allow an operator to obtain access to the removal volume, for selected removal of compost material collected therein. Preferably, the conveying means includes at least one screw conveyor arranged to selectively move compost across the horizontal floor of the compost tank and to the removal area.

In preferred embodiments, the lowermost part of the tank comprises both the liquid collection volume and the removal area of the compost, and the removal area forms a portion of the lower compost collection volume. Not only can the fully decomposed material be forced into the removal area by means of the conveying mechanism, but also this volume will provide for the lower fluid collection area for any fluids in the tank, to be selectively collected and circulated by the liquid circulation arrangement.

According to the present invention a method for composting organic material is provided. Generally, according to the method the organic material is placed within the composting tank, and is composted upon circulation of the air therethrough, with mixing as necessary. The preferred method includes a step of providing fluid within the tank, and recirculating the fluid from lower portions to the tank to upper portions of the tank, as desired, to maintain a moist environment throughout compost positioned within the tank. Recirculation of the moisture in this manner, facilitates composting.

BRIEF DESCRIPTION OF THE DRAWINGS

The drawings constitute a part of this specification and include exemplary embodiments of the present invention, while illustrating various features thereof. It will be understood that in some instances relative material thicknesses and component sizes may be shown exaggerated, to facilitate an understanding of the invention.

FIG. 2 is an enlarged, fragmentary, partially schematic perspective depiction of a composting apparatus and arrangement according to the present invention.

DETAILED DESCRIPTION OF THE INVENTION

Figure 1:
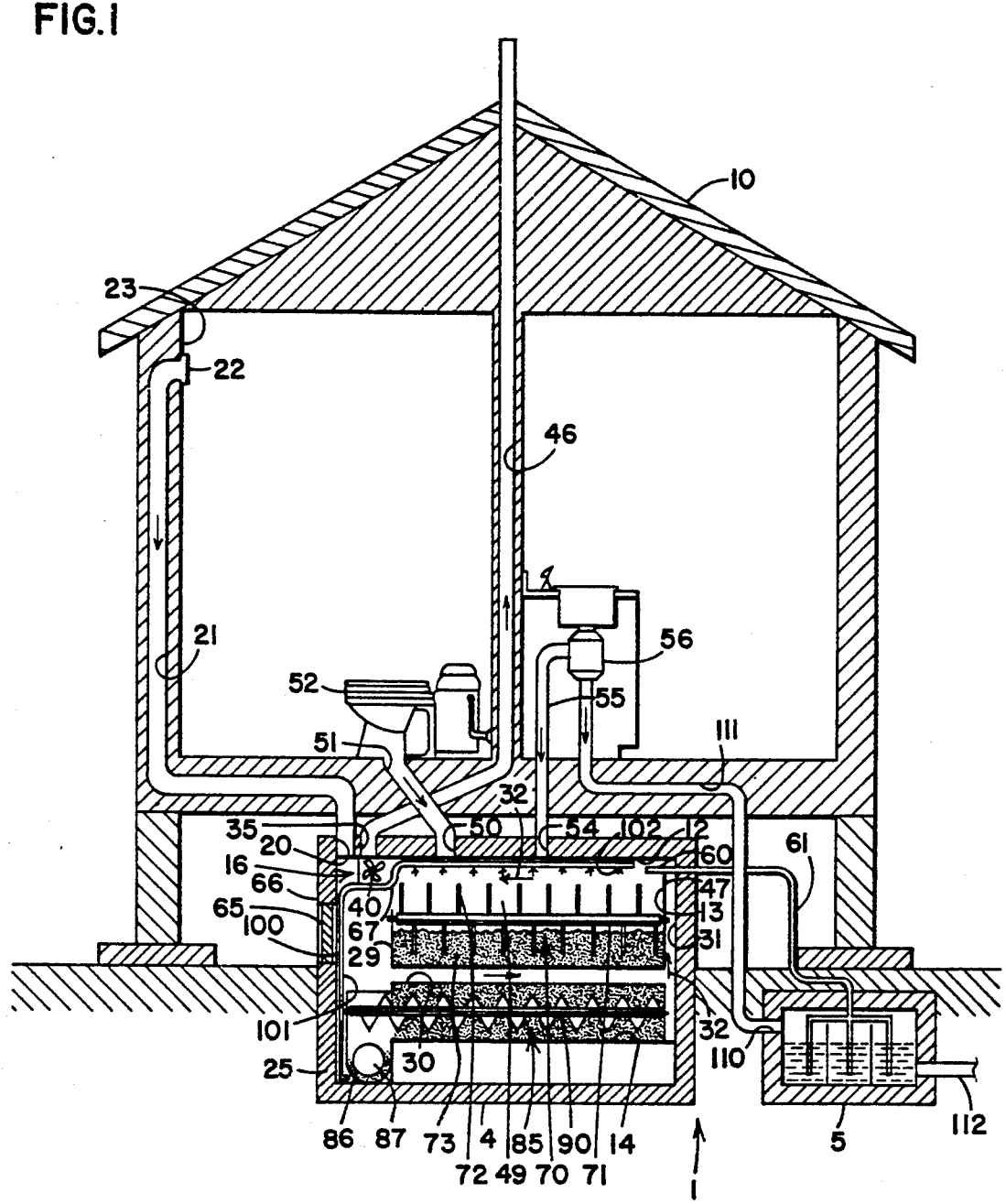
FIG. 1 is a schematic, cross-sectional, representation of a composting apparatus and arrangement according to the present invention, depicted in operative association with a dwelling.

As required, detailed embodiments to the present invention are disclosed herein. It is to be understood, however, that the disclosed embodiments are merely exemplary of the invention, which may be embodied in various forms. Specific structural and functional details disclosed herein are not to be interrupted as limiting, but rather as basis for the claims and as a representative bases for teaching one skilled in the art to variously employ the present invention in virtually any appropriately detailed structure, system, arrangement or manner.

The reference numeral 1, FIG. 1, generally indicates a composting system or arrangement according to the present invention. The arrangement 1 is depicted, schematically, in an environment for use. The system 1 depicted includes two major components, a composting tank arrangement 4 and a greywater treatment tank arrangement 5. The system 1 is shown in orientation for use in association with a dwelling 10.

Composting tank 4 includes an upper waste receiving volume 12, a central mixing and aeration volume 13, and a lower compost collection volume 14. The tank 4 includes an air circulation arrangement 16 therein which provides for a draw of air into the composting tank 4, circulation through the central mixing and aeration volume 13, and venting, including venting of water and carbon dioxide products from decomposition occurring within the tank 4.

Still referring to FIG. 1, the air circulation arrangement is shown including an air inlet 20 operably connected by means of conduit 21 to receive warm air through intake 22, from an interior region 23 of dwelling house 10. In general, the biological decomposition activity which will take place in tank 4 is facilitated by heat and generates heat. The heat is generally preserved within the tank 4 by means of insulated walls 25. Draw of relatively warm, relatively moist, air from upper regions 23 of dwelling 10, facilitates the decomposition process.

Still referring to FIG. 1, the air circulation arrangement 16 includes a front or first baffle arrangement 29 and an air conduit arrangement 30 providing for airflow across central mixing and aeration volume 13 to a side 31 of tank 4 opposite from inlet 20. The air can then circulate upwardly and along the paths indicated by arrows 32, to exit 35. A fan arrangement 40 mounted within tank 4 helps drive the system. In particular, fan 40 is separated from inlet 20 by front baffle 29, and with appropriate orientation fan 40 can be operated to draw air through conduit 21 into inlet 20, through conduit 30, to side 31, and then across upper receiving volume 12. The air can then be driven outwardly, by the fan 40, through exit port or vent 35. The exit port 35 is shown in communication with a vent conduit 46, which can then disperse water and carbon dioxide generated within tank 4 to the atmosphere. Air circulation is facilitated by rear baffle 47, which is part of a preferred baffle arrangement. The air conduit arrangement 30 provides for good air circulation completely across tank 4, even as space 49 between baffles 29 and 47 fills with material, as a result of airflow communication completely between and through baffles 29 and 47.

Still referring to FIG. 1, composting tank 4 is shown adapted for receiving waste material to be acted upon from four sources. The first of these is through inlet 50, which communicates via conduit 51 with toilet 52. It is foreseen that typical uses of arrangement 1 will be with toilets 52 that utilize little or no water for flushing.

The second inlet is indicated at reference numeral 54, which by means of conduit 55, receives kitchen scraps or the like from garbage disposal 56, again preferably with little or no water.

Another inlet for material to be composted in tank 4 is represented by inlet and dispersion pipe 60. This pipe communicates with greywater treatment tank 5, by means of conduit 61, to selectively receive sludge material therefrom.

Finally, when tank 4 is used, it will sometimes be desirable to load bulk organic material into the interior tank 4, to facilitate aerobic processes therein. Such material will, for example, include wood shavings and/or soil which can provide needed microorganisms and/or nutrient material to tank 4. Such bulk organic material can be added through a hatch arrangement, such as hatch 65 in sidewall 66 and a door 67 in baffle 29. It is noted that hatch 65 also provides for access to remove fully composted material from tank 4, as described below. In FIG. 1, the door 67 is shown as a gap in baffle 29. In typical operation, see FIG. 2 below, the door 67 will include an openable cover thereon.

Still Referring to FIG. 1, the central mixing and aeration volume 13 includes an agitator or mixer arrangement 70 therein. Agitator 70 comprises an elongate rod 71 having vanes or tines 72 thereon which, upon rotation of rod 71, stir organic material 73 received within tank 4, facilitating aerobic biological decomposition. Tines 72 are preferably oriented along the length of elongate rod 71 in an offsetting manner as shown in FIG. 2, such that the tines are oriented in a noncoplanar arrangement around the rod. Agitator 70 may include any of a variety of actuator arrangements, including hand cranks and power driven arrangements.

As previously indicated, composting tank 4 includes a lower compost collection volume 14. In general, fully composted material will eventually settle to this portion of tank 4. The region 14 includes a conveyor mechanism 85, which can selectively collect and convey material toward removal area or volume toward 86 wherefrom it can be readily removed, for example by manual access through hatch 65. Such fully composted material is shown in FIG. 1 at 87.

For the embodiment depicted in FIG. 1, the conveyor mechanism 85 comprises a screw conveyor 90. The screw conveyor 90 may be driven, as necessary, by a mechanical drive arrangement, or hand crank. In general, it is foreseen the hand crank arrangement will be preferred, especially in remote locations.

It is noted that in selected uses, some water or liquid materials may be transported into tank 4, for example through inlets 50, 54 and/or 60. This water will tend to settle toward the bottom of tank 14, for example in region 86. Preferably composting tank 4 includes therein a pump/circulation arrangement 100 for the handling of this water. In particular, the water can be drawn up from region 86 into conduit 101. The water may then, under pressure, be forced out of sprayers 102 on top of compost material 73 in tank 4. Valving arrangements may also be used to direct the excess water outwardly from tank 4, if desired.

Numerous advantages result from a pump/circulation system, when applied as described. For example, any excess water is readily handled, i.e. it is circulated to upper regions of the tank 4, whereat it can come into better contact with air and be driven outwardly through venting aperture or exit port 35. Further, moisture facilitates the biological processes which lead to decomposition, and the water circulation system helps ensure that upper portions of material 73 do not dry out to an extent likely to inhibit decomposition. It is noted however, that relatively little water is to be used, and large volumes of free-standing water are generally avoided in composting arrangements. Should excess free-standing water occur, it can be directed, by valve arrangements associated with the pump/circulation means outwardly from the compost tank 4.

It will be understood that while tank 4 is shown schematically in FIG. 1 receiving organic material from basically four sources, a plurality of other sources may be utilized. It is foreseen, however, that generally the four sources indicated will be the ones used in typical operations.

Still Referring to FIG. 1, greywater treatment tank 5 is shown receiving water from sources within dwelling 10, such as from showers and sinks, through inlet 110 and conduit 111. Within tank 5 various purifications/settling steps can take place, with the clarified effluent being discharged through effluent line 112. By means of a variety of pump arrangements, sludge material or settled material within 5 can be discharged through conduit 61 and inlet 60, into composting tank 4. This sludge may be fairly wet, and the liquid circulation system in tank 4 will facilitate dispersion and drying. Should excess water be present, valving arrangements may be used to direct some collected water outwardly from tank 4, and if desired, to the greywater tank 5.

Further detail concerning composting tank 4 will be understood by reference to FIG. 2. In FIG. 2, composting tank 4 is shown in perspective. It will be understood that the representation of FIG. 2 is somewhat schematic, and that a variety of specific mechanical members can be utilized to achieve the features indicated.

Tank 4 includes upper and lower sections 120 and 121 joined along flanges 122 and 123. Formation of tank 4 from sections facilitates transport and assembly. A variety of section sizes may be used, depending primarily on the amount of waste material to be handled. Access hatch 125 is shown in section 120, and provides access to the interior 126 of tank 4, for maintenance, charging with bulk organic material, and/or removal of composted material. Tank 4 includes internal baffle 130, which operates as does baffle 29 discussed with respect to FIG. 1. Baffle 130 includes a door 131 therein, for access to innermost portions of the tank 4. The door may comprise a hinged cover or similar arrangement. Hatch 125 includes removable cover 132.

In FIG. 2, tank 4 is shown having a pair of screw conveyors 133 therein, and a pair of parallel mixers or agitators 134. These may be as previously described for analogous components shown in FIG. 1. Rear baffle 136, analogously to rear baffle 47, FIG. 1, defines an airflow space 137 therebehind, for air circulation.

The water circulation system is generally indicated at reference numeral 140, and comprises float valve 141, transport conduit 142, pump 143, and dispersers or sprayer arrangement 144 located in the upper portion of the tank 4. Means facilitating liquid dispersion include spray apertures 145 in the sprayer arrangement 144. The circulation system may include an auxiliary line 144a, provided with a valve 144b, so that excess water can be selectively directed back to the greywater tank 5, if desired.

As will be understood from FIG. 2, tank 4 depicted includes some of the other features described with respect to FIG. 1, including an inlet to tank 4 from the toilet tank at 145, an inlet from the garbage disposal at 146, and an exhaust port at 147. Inlet to tank 4 from the greywater treatment is shown via pipe 150, withdraw of sludge from greywater treatment tank being via conduit 151, under pressure applied by pump 152.

Provision of an air conduit across tank 4 is accomplished by means of inverted V conduits 155, which communicate between and through baffles 130 and 136. Thus, even as the innermost portion 158 of tank 4 fills with waste and compost, good air circulation is maintained therethrough. A fan is shown at 159, for control of airflow.

In FIG. 2 a greywater treatment tank 5 is depicted. Generally, the tank includes an inlet 160 and an effluent line 161. The tank 5 may include a plurality of chambers for various steps of water treatment including aeration and/or filtration and/or clarification. It is foreseen that in typical use, a variety of conventional water purification steps may be accomplished in tank 5, with the ultimate result eventually being settling of sludge material within the tank 5. The sludge material can be driven, by pump 152 and lines 150 and 151 into compost tank 4 so that the sludge is added to the compost for decomposition. It will be understood that the tank 5 may include numerous components, not detailed, for water flow direction, aeration, sludge handling etc. The tank 5 is shown with individual chambers having floors sloping toward centers whereat sludge pick-ups 163 are positioned to draw sludge into lines 150 and 151.

From examination of FIGS. 1 and 2 it will be readily understood that tank 4 generally has a flat bottom, 165 (FIG. 2) with a step down or removal area 166, FIG. 2. Advantages are obtained from this. First, as a result the tank can be made relatively large, even without substantial vertical extension. The conveyor readily brings the fully decomposed material to area 166 for ready access by user, and thus a relatively long tank can be used. Since the tank can be relatively long and shallow, good aeration is facilitated. If portions of the tank 4 are to be buried, the depth of the excavation can be relatively shallow. A slanted liquid drain arrangement may be used to direct fluid into region 166, for collection by water circulation arrangement 140.

Advantages are also obtained from the screw conveyors previously indicated, in that they can be operated, selectively, to bring fully decomposed material into ready access for removal from the tank 4, via hatch 125, from area 166.

A highly efficient composting system results, through combination with the greywater treatment. That is, sludge removal from the greywater treatment is facilitated, by directing it into composted tank 4 whereat its volume is reduced considerably. Water can be readily handled by the circulation system 140 in tank 4.

It is foreseen that in a typical operation composting tank 4 will be initially charged with a large volume of wood chips, soil and other material including microbial material for accomplishing the desired decomposition. Over time, wastes will be added to these initial charges, for example via the toilet, garbage disposal and/or greywater treatment tank. After a rather extended period of time, during which there is an occasional mixing of the composting material and/or addition of further nutrient and/or charging material thereto, in the bottom of the tank for a substantial amount of substantially fully decomposed material will collect. After that time, and periodically from then on, the conscrew conveyors can be operated to discharge the fully decomposed material into region 166, wherefrom it can be readily removed.

It is foreseen that in a typical operation with a one toilet, one disposal, four person cabin or the like, the initial operation of the tank may be for several years before the first discharge operation is necessary. The mixing cranks need only be turned gently every few months or so, for efficient operation. It is noted that the system of the invention may be used to handle biological waste materials from sources other than those enumerated.

It is to be understood that while certain embodiments of the present invention have been illustrated and described, it is not to be limited to the specific forms or arrangement of parts herein described and shown.

What is claimed and desired to be secured by Letters Patent is as follows:

1. An arrangement for facilitating aerobic composting of organic material including human toilet wastes; said arrangement comprising:
   (a) a compost tank with front and rear walls and having therein an interior, an interior including: an upper portion with a receiving volume; a central portion with a mixing and aeration volume; and a lower portion with a compost collection volume; the lower portion further including a bottom, a compost removal area, and a fluid collection area;
      (i) said mixing and aeration volume being oriented beneath said receiving volume and above said compost collection volume, compost removal area and fluid collection area;
      (ii) said fluid collection area having a lower wall oriented lower than, and laterally spaced relative to, said compost collection volume bottom;
      (iii) said compost removal area being laterally spaced from said compost collection volume bottom;
      (iv) said mixing and aeration volume being defined by front and rear baffles, said front baffle being spaced from said compost tank front wall to define an airflow inlet region therebetween, and said rear baffle being spaced from said rear wall to define a second airflow region therebetween, wherein said second airflow region is in direct airflow communication with said receiving volume;
   (b) an airflow conduit arrangement mounted in said compost tank, between said front and rear baffles, and extending from said airflow inlet region to said second airflow region;
   (c) a draw fan positioned in said receiving volume and separated from said airflow inlet region by said front baffle; said draw fan being oriented to draw air: from said airflow inlet region; through said airflow conduit arrangement; through said second airflow region; and, from said rear baffles to said front baffles substantially across said receiving volume;
   (d) conveyor means mounted in said compost collection volume for periodic transport of compost to said compost removal area;
   (e) liquid circulation means in said compost tank including means for collecting liquid in said fluid collection area and deliverance of same to said mixing and aeration volume;
   (f) horizontally oriented agitation means mounted in said mixing and aeration volume for periodic mixing of organic material received and retained therein; and
   (g) a greywater treatment tank having a sludge removal system and a plurality of chambers therein, at least one of said chambers providing for the aeration, filtration, clarification, or any combination thereof, or greywater contained therein, wherein said sludge removal system includes sludge inlet means for transport of sludge from said greywater treatment tank to said compost tank mixing and aeration volume.

2. An arrangement according to claim 1, wherein said liquid circulation means includes a collection conduit, a distribution conduit, and a pump mechanism; said collection conduit being in fluid flow communication with said fluid collection area to receive fluid collected thereat; said distribution conduit being in fluid flow communication with said collection conduit and including means for spraying fluid into compost in said mixing and aeration volume; and, said pump mechanism being constructed and arranged to direct fluid flow through said liquid circulation means.

3. An arrangement according to claim 1, wherein said conveyor means includes at least one screw conveyor.

4. An arrangement according to claim 1, wherein said conduit arrangement includes at least one inverted V airflow conduit.

5. An arrangement according to claim 1, wherein said agitation means includes a physical mixing apparatus having one or more elongate rods, each rod including a plurality of tines mounted thereon, said tines facilitating the mixing of the organic material upon rotation of said rods.

6. The arrangement of claim 1 wherein said tines are mounted on said elongate rods of said physical mixing apparatus in an offsetting noncoplanar arrangement.

* * * * *